United States Patent
Hiraya et al.

(10) Patent No.: US 6,612,294 B2
(45) Date of Patent: Sep. 2, 2003

(54) AUTO-IGNITION OF GASOLINE ENGINE BY VARYING EXHAUST GAS RETAINING DURATION

(75) Inventors: Koji Hiraya, Yokohama (JP); Hiroshi Miyakubo, Kanagawa (JP); Atushi Teraji, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/813,892

(22) Filed: Mar. 22, 2001

(65) Prior Publication Data

US 2001/0027783 A1 Oct. 11, 2001

(30) Foreign Application Priority Data

Mar. 30, 2000 (JP) ........................................ 2000-095500

(51) Int. Cl.[7] ............................................... F02M 25/07
(52) U.S. Cl. ............................ 123/568.14; 123/90.16
(58) Field of Search .......................... 123/568.14, 90.15, 123/295, 305, 430, 435

(56) References Cited

U.S. PATENT DOCUMENTS

| 4,397,270 A | 8/1983 | Aoyama | 123/90.16 |
| 5,517,954 A * | 5/1996 | Melchior | 123/65 W |
| 5,669,343 A | 9/1997 | Adachi | 123/90.17 |
| 5,785,016 A | 7/1998 | Enderle et al. | 123/90.11 |
| 5,836,276 A | 11/1998 | Iwasaki et al. | 123/90.17 |
| 5,988,125 A | 11/1999 | Hara et al. | 123/90.16 |
| 6,135,088 A | 10/2000 | Duret | |
| 6,234,123 B1 * | 5/2001 | Iiyama et al. | 123/90.15 |
| 6,267,097 B1 * | 7/2001 | Urushihara et al. | 123/299 |
| 6,336,436 B1 * | 1/2002 | Miyakubo et al. | 123/295 |

FOREIGN PATENT DOCUMENTS

| EP | 0 953 744 A | 3/1999 |
| FR | 2 760 487 A | 9/1998 |
| GB | 2 313 623 A | 12/1997 |
| JP | 10-266878 | 10/1998 |
| JP | 11-294125 | 10/1999 |
| JP | 2000-73797 | 3/2000 |

OTHER PUBLICATIONS

U.S. patent application Ser. No. 09/767,025, Urushihara et al., filed Jan. 23, 2001.
Ronald J. Pierik et al., "A Low-Friction Variable-Valve-Actuation Device, Part I: Mechanism Description and Friction Measurements," SAE Paper 970338, Society of Automotive Engineers, Inc., 1997, pp. 81–87.

* cited by examiner

Primary Examiner—Mahmoud Gimie
(74) Attorney, Agent, or Firm—Foley & Lardner

(57) ABSTRACT

A system and method controls auto-ignition of gasoline fuel within a cylinder of an internal combustion engine by varying an exhaust gas retaining duration. A generator provides a parameter indicative of combustion event within the cylinder. An engine controller adjusts an inlet control device and an outlet control device to retain exhaust gas for subjecting the retained exhaust gas to compression. In order to vary duration of the exhaust gas retaining phase, closing timing of the outlet control device is varied based on the parameter.

20 Claims, 17 Drawing Sheets

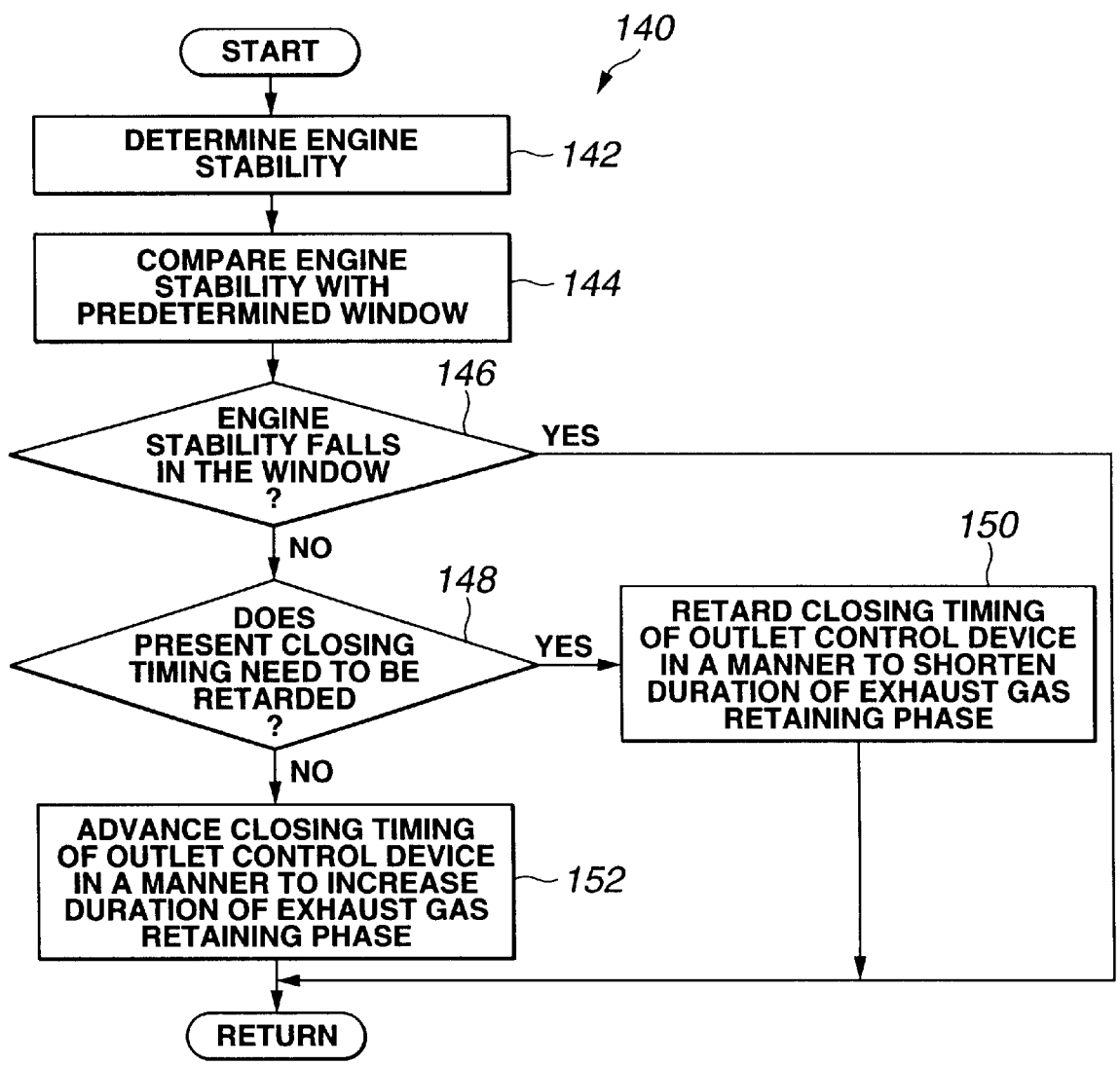

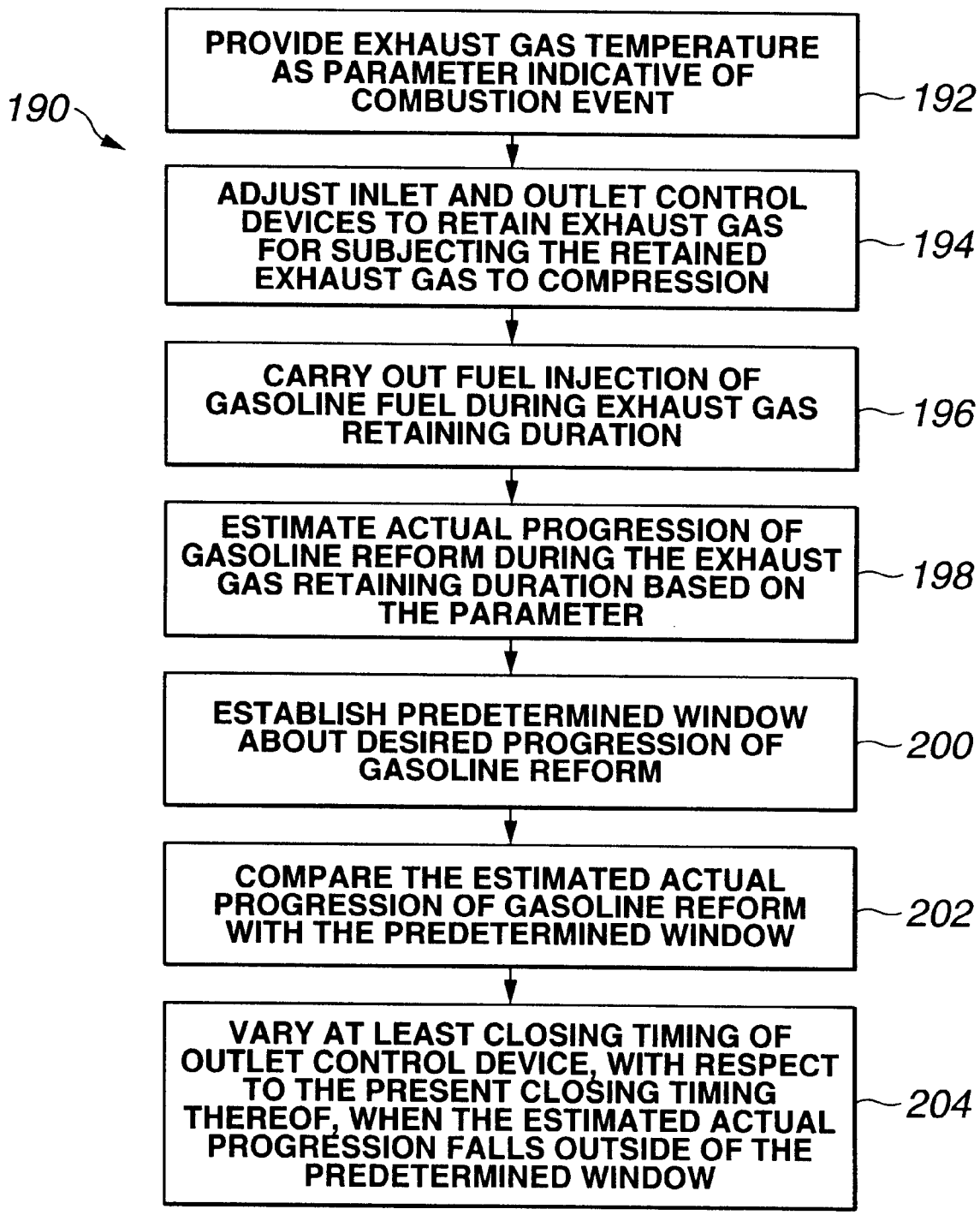

AUTO-IGNITION OF GASOLINE ENGINE BY VARYING EXHAUST GAS RETAINING DURATION

BACKGROUND OF THE INVENTION

1. Field of the Invention

The present invention relates to a system and method for controlling auto-ignition of a four-stroke gasoline internal combustion (IC) engine, and an auto-ignition type IC engine.

2. Description of Related Art

JP-A 10-266878 discloses a technique to accomplish auto-ignition of gasoline fuel over a predetermined load range from low load to middle load by adjusting closing timing of an exhaust valve as well as opening and closing timings of an intake valve. According to this known technique, over the predetermined load range, an opening timing of the exhaust valve is held invariable at a crank position before a bottom dead center (BDC) position of expansion stroke against variations of load request, but a closing timing of the exhaust valve is adjusted to varying crank positions before a top dead center (TDC) position of exhaust stroke against varying load request. A throttle valve is fully opened over this predetermined load range. The closing timing of the exhaust valve advances as load request becomes low to increase the amount of exhaust gas remaining in a cylinder to decrease the amount of fresh charge. In order to retain exhaust gas, the opening timing of the intake valve is adjusted to varying crank positions after the TDC position of exhaust stroke against varying load request over the predetermined load range. The opening timing of the intake valve retards as load request becomes low. The closing timing of the intake valve is adjusted to varying crank positions after a bottom dead center (BDC) position of intake stroke against varying load request over the predetermined load range. The closing timing of the intake valve retards gradually as load request becomes high over a portion of the predetermined load range and then advances gradually as load request becomes high over the remaining portion of the predetermined load range. According to this known technique, closing timing of the exhaust valve controls the amount of exhaust gas in the cylinder, thereby controlling available combustion chamber volume for receiving fuel mixture thereby controlling load. Further, closing timing of the intake valve advances during operation with load where auto-ignition is difficult to accomplish. Advancing closing timing of intake valve increases a compression ratio thereby increasing temperature of the mixture in the cylinder.

The known technique is satisfactory to some extent, however, involves a potential problem that auto-ignition might not be sustained against variation of temperature conditions in the cylinder. The variation of temperature conditions include a change in cylinder wall temperature during transient operation of the engine at warming-up or acceleration, and a cyclic change in cylinder wall temperature due to a change in intake air temperature, a cycle-by-cycle variation of intake air amount, and a cycle-by-cycle variation of fuel injection amount. It is known that, with the same load request, advancing closing timing of exhaust valve causes an increase in temperature in cylinder thereby sustaining auto-ignition against an undesired drop in cylinder wall temperature. However, if closing timing of exhaust valve is always advanced in the above manner to retain sufficient amount of exhaust gas to deal with the undesired drop in cylinder wall temperature, the temperature in the cylinder is always elevated, inducing cooling loss thereby deteriorating fuel economy.

Thus, there would be a need for fine and accurate control of exhaust gas retaining phase to accomplish auto-ignition and to minimize cooling loss as well.

SUMMARY OF THE INVENTION

An object of the present invention is to control auto-ignition to meet the above-mentioned need.

In one aspect of the present invention, the above object is achieved by an auto-ignition type internal combustion engine, which comprises at least one cylinder, an inlet control device for controlling flow into the cylinder, an outlet control device for controlling flow from the cylinder, a fuel injection device for supplying gasoline fuel into the cylinder, a generator for providing a parameter indicative of combustion event within the cylinder, and an engine controller for adjusting the inlet and outlet control devices to retain exhaust gas for subjecting the retained exhaust gas to compression and varying at least closing timing of the outlet control device based on the parameter.

BRIEF DESCRIPTION OF THE DRAWINGS

The present invention will be more fully appreciated as the same becomes better understood from the following detailed description when considered in connection with the accompanying drawings, in which like reference numerals and characters designate like or corresponding parts through the several views.

FIG. 10 is a flowchart illustrating a portion of control logic according to the present invention.

FIG. 12 is a block diagram illustrating control logic according to the present invention.

BEST MODES FOR CARRYING OUT THE INVENTION

Figure 1:
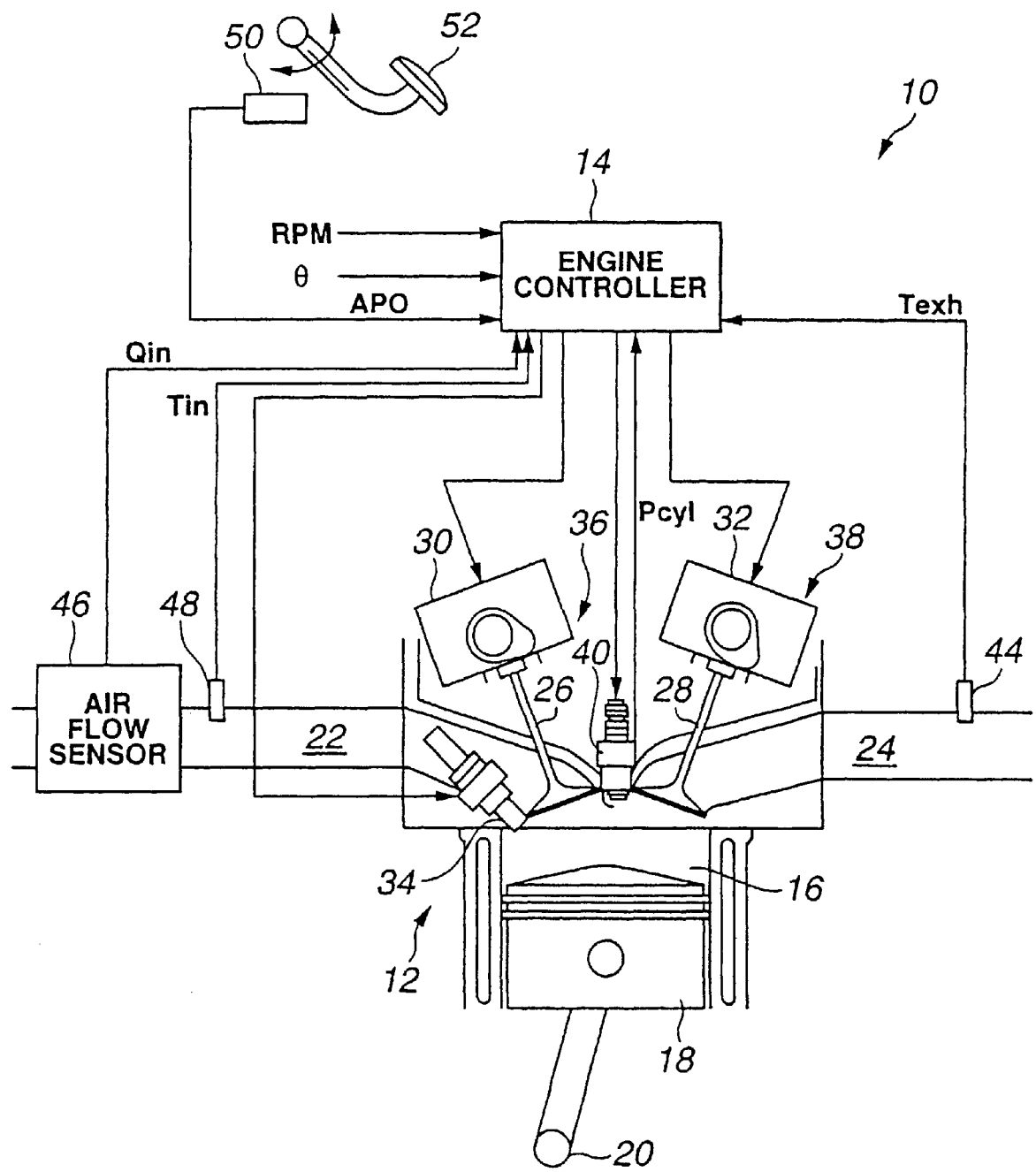
FIG. 1 is a block diagram illustrating an auto-ignition type internal combustion engine, a system and method for engine control according to the present invention.

FIG. 1 provides a block diagram of a system or method for controlling auto-ignition of gasoline fuel of a four-stroke internal combustion engine. System 10 includes an internal combustion engine, indicated generally by reference numeral 12, in communication with an engine controller 14.

In FIG. 1, the area of a combustion chamber of engine 12 is shown. Engine 12 has at least one cylinder 16 in which a piston 18 is located and connected to crankshaft 20 Combustion chamber or cylinder 16 is shown communicating within intake manifold 22 and exhaust manifold 24 via intake and exhaust valves 26 and 28, which are actuated by variable valve controllers 30 and 32. Fuel injector 34 of a fuel injection device is shown directly communicating with the combustion chamber within cylinder 16 for spraying gasoline fuel directly therein.

Inlet flow into cylinder 16 is governed by an inlet control device 36. Outlet flow from cylinder 16 is governed by an outlet control device 38. In a preferred embodiment, inlet control device 36 is intake valve 26 actuated by valve controller 30, and outlet control device is exhaust valve 28 actuated by valve controller 32. However, as one skilled in the art would recognize, there are many alternative embodiments.

In cases where engine 12 operates on spark ignition combustion, particular control timing is transmitted to spark plug 40. In cases where engine 12 operates on auto-ignition combustion, no such control timing is transmitted to spark plug 40.

Various sensors are provided to monitor auto-ignition combustion event within cylinder 16. Sensors may include a cylinder pressure sensor (not shown in FIG. 1) that detects progression of cylinder pressure (Pcly) within cylinder 16. In one embodiment, processing of the sensor signals from the cylinder pressure sensor is carried out. In another embodiment, signals from other sensors are processed to monitor auto-ignition combustion event. Such other sensors may include an exhaust gas temperature sensor 44, an air flow sensor 46, and an intake air temperature sensor 48. Exhaust gas temperature sensor 44 detects temperature of exhaust gas (Texh) from cylinder 16. Air flow sensor 46 detects amount of intake air (Qin) into intake manifold 22. Intake air temperature sensor 48 detects temperature of intake air (Tin) into intake manifold 22.

Engine 12 may include various other sensors such as an engine speed sensor to provide a signal indicative of engine speed (RPM), a crank angle sensor to provide a signal indicative of crank angle (θ), a pedal position sensor 50 to provide a signal indicative of the opening angle (APO) of an accelerator pedal 52, and the like. Accelerator pedal 52 is used to determine the driver demand, which, in turn, is used, as a load request, in the calculation of quantity of fuel injection.

Figure 2:
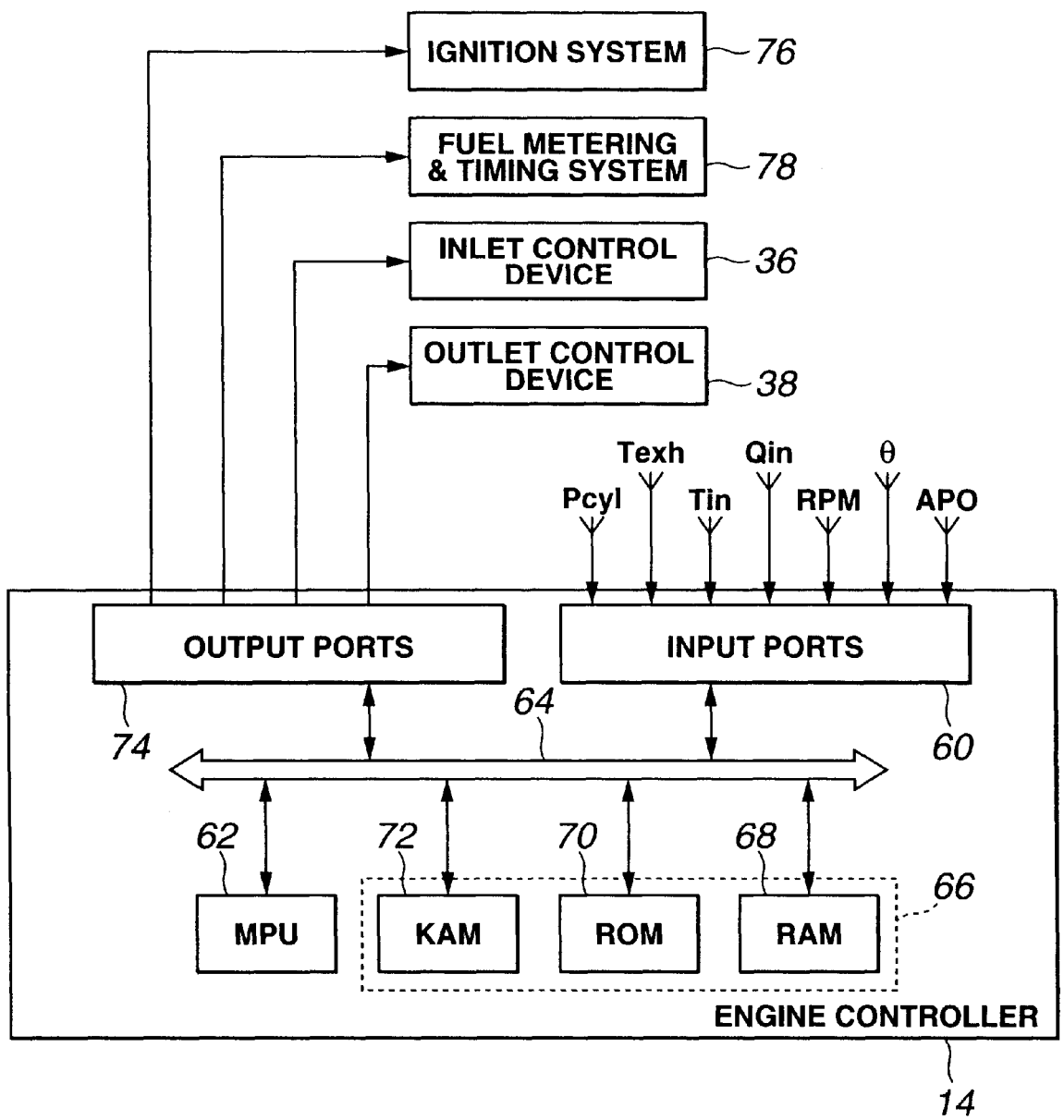
FIG. 2 is a block diagram illustrating engine controller according to the present invention.

Referring to FIG. 2, engine controller 14 receives signals from the various sensors via input ports 60, which may provide signal conditioning, conversion, and/or fault detection, as well known in the art. Input ports 60 communicate with processor 62 via a data/control bus 64. Processor 62 implements control logic in the form of hardware and/or software instructions, which may be stored in computer readable storage medium 66, to effect control of engine 12. Computer readable storage medium 66 may include various types of volatile or nonvolatile memory such as random-access memory (RAM) 68, read-only memory (ROM) 70, and keep-alive memory (KAM) 72. These "functional" classifications of memory may be implemented by one or more different physical devices such as PROMs, EPROMs, EEPROMs, flash memory, and the like, depending upon the particular application.

In one embodiment, processor 62 executes instructions stored in computer readable storage medium 68 to carry out the method for controlling engine 12 in auto-ignition combustion mode to communicate with various actuators of engine 12 via output ports 74. Actuators may control ignition timing or spark 76, timing and metering of fuel 78, valve timing of inlet control device 36, and valve timing of outlet control device 38.

Characteristic engine diagrams for auto-ignition combustion mode and a spark-ignition combustion mode are stored in controller 14 in the form of valve timings of inlet and outlet control devices 36 and 38 as well as for controlling the fuel injection for auto-ignition combustion and for controlling the fuel injection and ignition timing for spark-ignition combustion.

Figure 3:
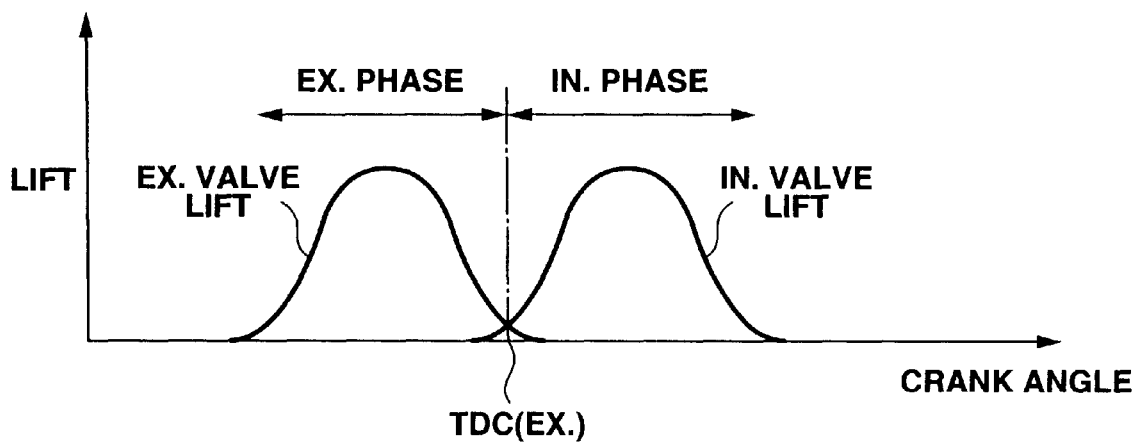
FIG. 3 is a valve lift diagram illustrating a valve overlap between an outlet control device for controlling flow from a cylinder and an inlet control device for controlling flow into the cylinder.

FIG. 3 provides a valve lift diagram illustrating a representative example of valve timings of inlet and outlet control devices 36 and 38 (intake and exhaust valves 26 and 28) for spark-ignition combustion at full or near full load. In spark-ignition combustion mode, controller 14 transmits timings to outlet and inlet control devices 38 and 36 to provide optimum valve overlap duration around top dead center (TDC) of exhaust stroke of piston 18.

Figure 4:
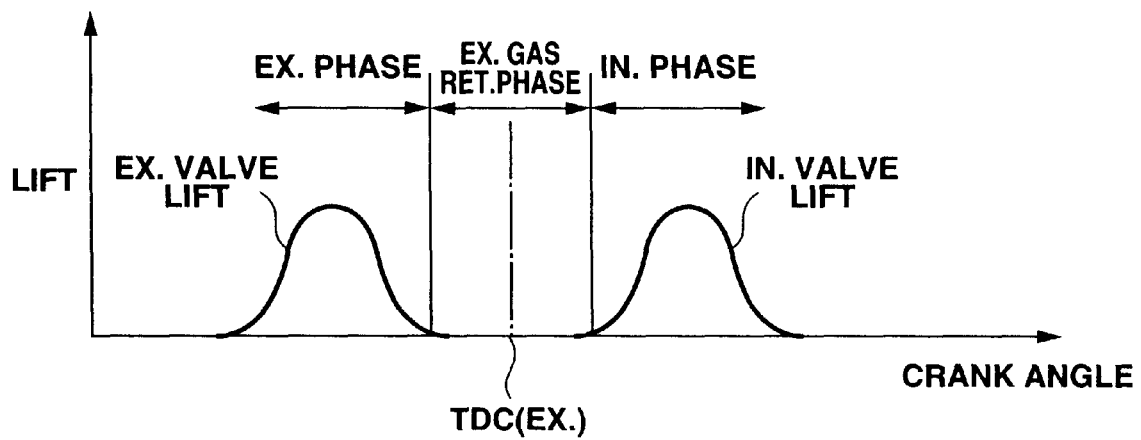
FIG. 4 is a valve lift diagram illustrating a minus valve overlap between the outlet and inlet control devices to provide an exhaust gas retaining phase after an exhaust phase and before an intake phase.

FIG. 4 provides a valve lift diagram illustrating valve timings of inlet and outlet control devices 36 and 38 (intake and exhaust valves 26 and 28) for auto-ignition combustion according to the present invention. For providing environment of auto-ignition, exhaust valve 28 of outlet control device 38 is allowed to close before piston 18 reaches the TDC of the exhaust stroke, so that high temperature exhaust gas is retained and compressed in cylinder 16 during the last travel section of the piston exhaust stroke. Intake valve 26 of inlet control device 36 is opened after the TDC position of the exhaust stroke. Setting of opening timing is such that inlet control device 36 is allowed to open after almost all of work done by piston 18 to compress the retained gas has been transferred to energy to move piston 18 in downward direction from the TDC position. Exhaust gas is retained and compressed in cylinder 16 because both outlet and inlet control devices 38 and 36 are allowed to close. Compression of the retained exhaust gas causes an increase in cylinder temperature, which provides advantageous influence on auto-ignition at around completion of the subsequent piston compression stroke.

For understanding of auto-ignition of gasoline fuel by retaining exhaust gas, reference should be made to the commonly assigned pending U.S. patent application Ser. No. 09/767,025, entitled "SYSTEM AND METHOD FOR AUTO-IGNITION OF GASOLINE INTERNAL COMBUSTION ENGINE", which claims priority of Japanese Patent Application No. 2000-015718 filed Jan. 25, 2000. The disclosure of this U.S. patent application is hereby incorporated by reference in its entirety.

Adjusting the rotational phase of a camshaft or a cam-driving shaft relative to a crankshaft of an engine is a well-known technique to vary opening and closing timings of a gas exchange valve. Examples of valve controllers employing such technique are shown in U.S. Pat. No. 5,669,343 (Adachi), U.S. Pat. No. 5,836,276 (Iwasaki et al.), and JP-A P2000-73797A. Also known is a technique to adjust the rotational phase of a pivotal cam relative to a crankshaft of an engine. According to this known technique, the valve open duration and valve lift are varied. Examples of valve controllers employing this known technique are shown in U.S. Pat. No. 4,397,270 (Aoyama), Ronald J. Pierik and Burak A. Gecim "A Low-Friction Variable-Valve-Actuation Device, Part 1; Mechanism Description and Friction Measurements" SAE Paper 970338, 1997, U.S. Pat. No. 5,988,125 (Hara et al.), and JP-A 11-294125. It is also known to electromagentically operate a gas exchange valve. A valve controller employing this technique is shown in U.S. Pat. No. 5,785,016 (Enderle et al.).

Any one of the above listed valve controllers may be used in inlet and outlet control devices 36 and 38.

Figure 5:
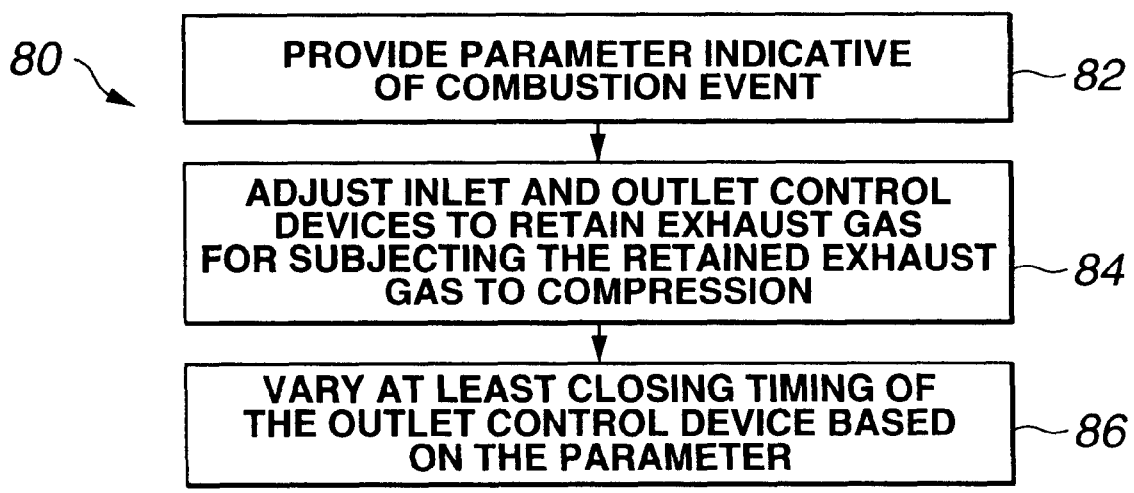
FIG. 5 is a block diagram illustrating control logic according to the present invention.

Referring to FIG. 5, a method of the present invention for controlling auto-ignition is generally indicated at 80. At block 82, a parameter indicative of combustion event in cylinder 16 is provided. At block 84, inlet and outlet control devices 36 and 38 are adjusted to retain exhaust gas for subjecting the retained exhaust gas to compression. At block 86, at least closing timing of outlet control device 38 is varied based on the parameter.

Figure 6:
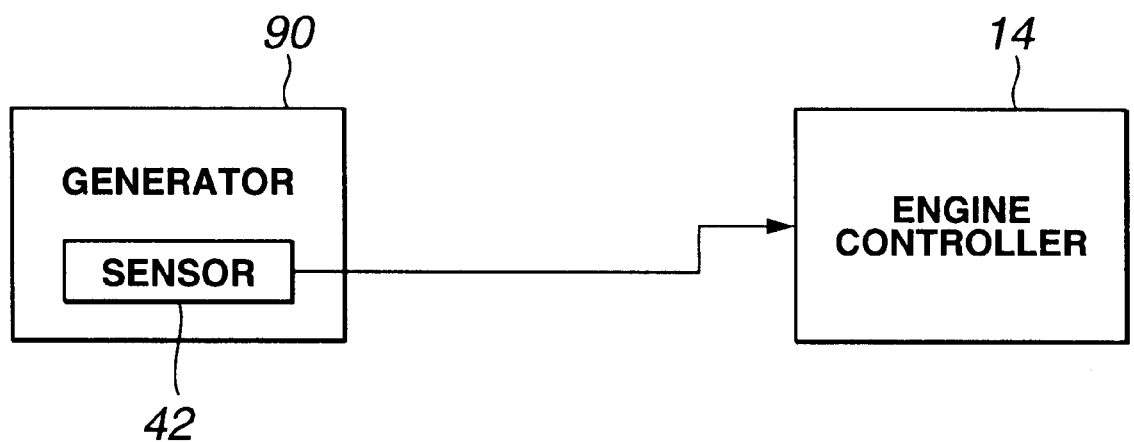
FIG. 6 is a block diagram illustrating a generator and an engine controller for engine control according to the present invention.

Referring to FIG. 6, a more general diagram shows a generator 90 which provides parameter indicative of combustion event in cylinder 16 to engine controller 14. In a preferred embodiment, generator 90 is cylinder pressure sensor 42 and provides the signal from sensor 42 as the parameter indicative of combustion event in cylinder 16.

Figure 8:
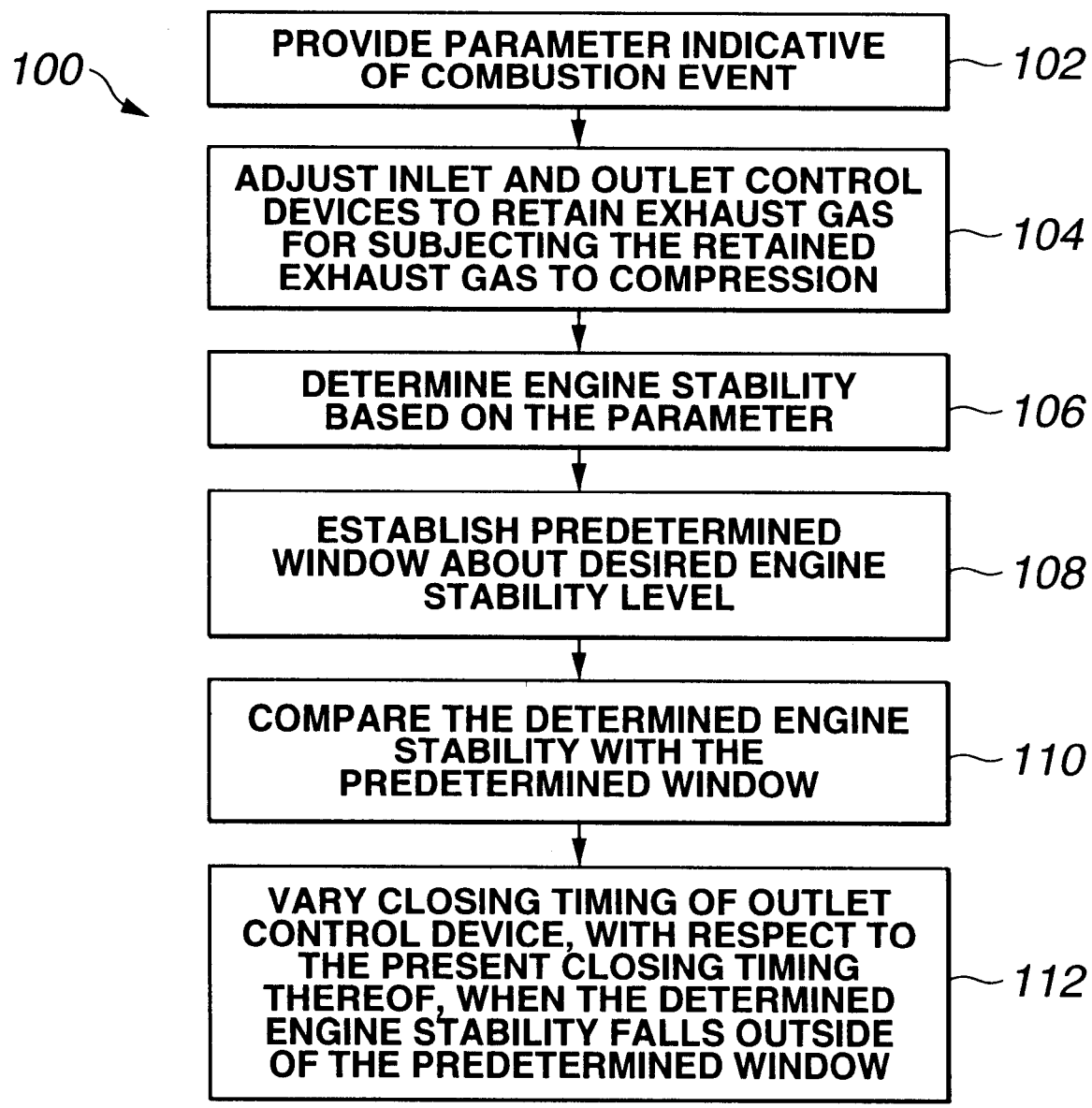
FIG. 8 is a block diagram illustrating control logic according to the present invention.

Referring to FIG. 8, in a preferred embodiment of the present invention, engine controller 14 determines engine stability and varies at least closing timing of outlet control device 38. As generally indicated at 100, parameter indicative of combustion event is provided (block 102). Inlet and outlet control devices 36 and 38 are adjusted to retain exhaust gas for subjecting the retained exhaust gas to compression (block 104). Engine stability is determined based on the parameter (block 106). A predetermined window is established about a desired engine stability level (block 108). The determined engine stability is compared with the predetermined window (block 110). At least closing timing of outlet control device 38 is varied, with respect to the present closing timing thereof, when the determined engine stability falls outside of the predetermined window (block 112).

Figure 9:
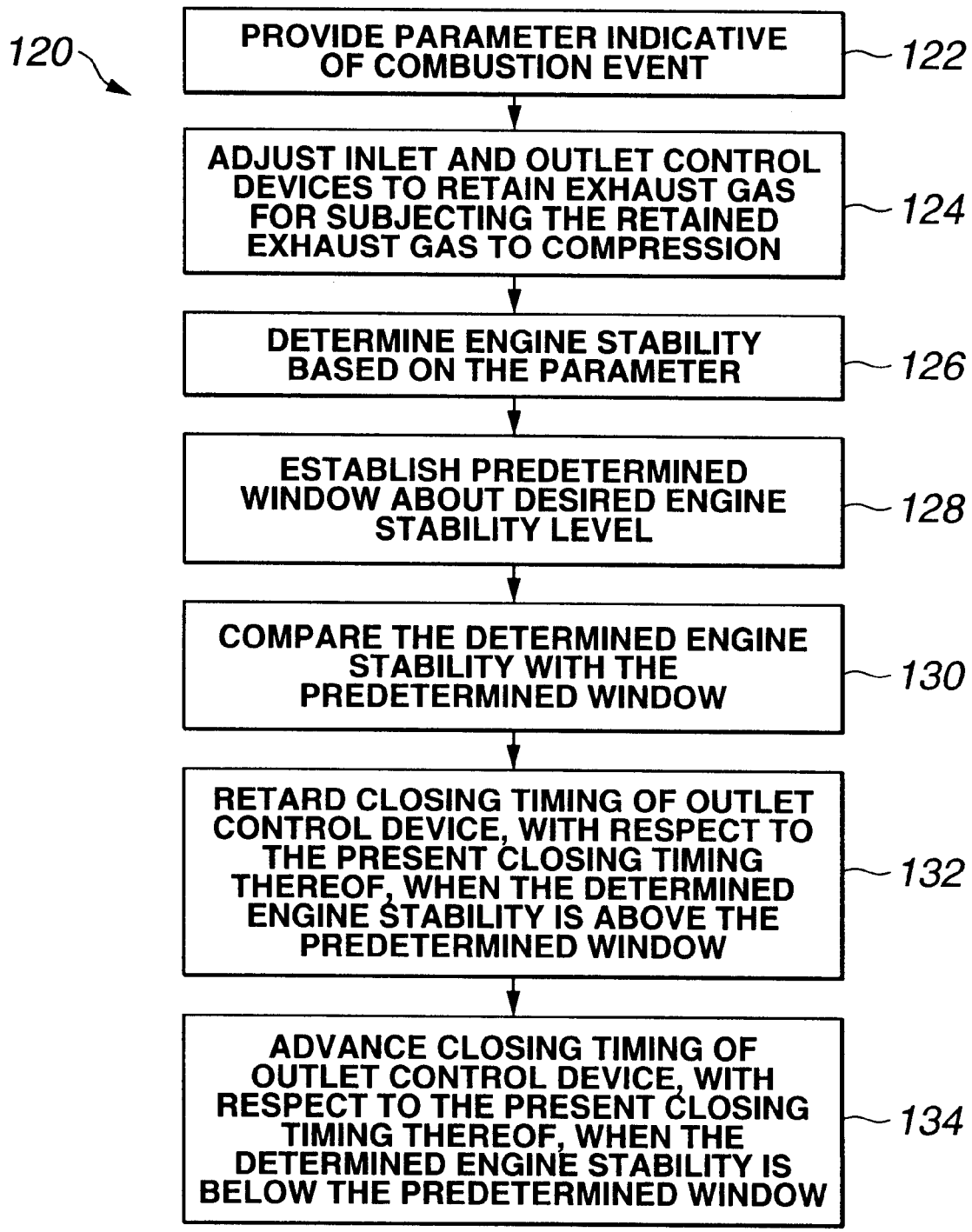
FIG. 9 is a block diagram illustrating control logic according to the present invention.

Referring to FIG. 9, in a preferred embodiment of the present invention, engine controller 14 determines engine stability and retards or advance closing timing of outlet control device 38. As generally indicated at 120, parameter indicative of combustion event is provided (block 122). Inlet and outlet control devices 36 and 38 are adjusted to retain exhaust gas for subjecting the retained exhaust gas to compression (block 124). Engine stability is determined based on the parameter (block 126). A predetermined window is established about a desired engine stability level (block 128). The determined engine stability is compared with the predetermined window (block 130). Closing timing of outlet control device 38 is retarded, with respect to the present closing timing thereof, when the determined engine stability is above the predetermined window (block 132). Closing timing of outlet control device 38 is advanced, with respect to the present closing timing thereof, when the determined engine stability is below the predetermined window (block 134).

An example of how a controller would implement blocks 126, 130, 132, and 134 of FIG. 9 can be understood with reference to FIG. 10. The flowchart of FIG. 10 illustrates a control routine, as generally indicated at 140, of the preferred implementation of the present invention. In block 142, controller 14 determines engine stability. In block 144, the determined engine stability is compared with a predetermined window around a desired engine stability level. In interrogation block 146, controller 14 determines whether or not the determined engine stability falls in the predetermined window. If this is the case, the routine is terminated. If the determined engine stability falls outside of the predetermined window, control goes to interrogation block 148. In block 148, controller 14 determines whether the present closing timing of outlet control device 38 needs to be retarded or advanced. If the determined engine stability is above the predetermined window, the present closing timing of outlet control device 38 needs to be retarded. If the determined engine stability is below the predetermined window, the present closing timing of outlet control device 38 needs to be advanced. If the interrogation of block 148 results in affirmative, control goes to block 150. In block 150, controller 14 provides command to retard closing timing of outlet control device 38 in a manner to shorten duration of exhaust gas retaining phase. If the interrogation of block 148 results in negative, control goes to block 152. In block 152, controller provides command to advance closing timing of outlet control device 38 in a manner to increase duration of exhaust gas retaining phase.

Turning back to FIG. 6, generator 90 provides sensor output as the parameter indicative of combustion event, and controller 14 processes the sensor output to determine level of engine stability. In this configuration, the term "generator" is meant to mean a sensor that detects phenomena directly or indirectly influenced by combustion event.

Figure 7:
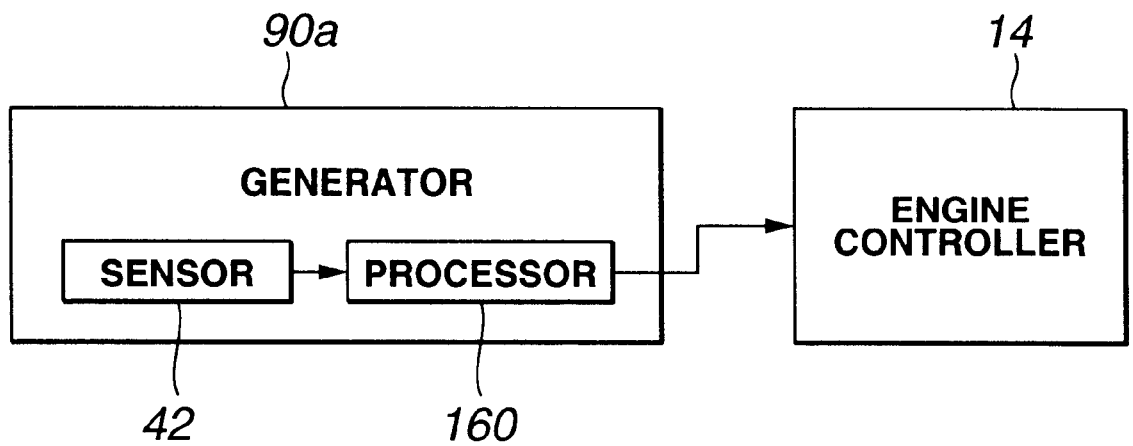
FIG. 7 is a block diagram illustrating a generator and an engine controller for engine control according to the present invention.

With reference to FIG. 7, a generator 90a includes sensor 42 and a processor 160 to provide, as parameter indicative of combustion event, level of engine stability. Engine controller 14 inputs the determined engine stability level and compares the same with the predetermined window around a desired engine stability level. In this configuration, the term "generator" is meant to encompass a processor in association with a sensor.

It is now appreciated that the term "generator" is meant to encompass the configurations exemplified with reference to FIGS. 6 and 7 and other equivalent control implementations as would be appreciated by one of ordinary skill in the engine control art.

Figure 11A:
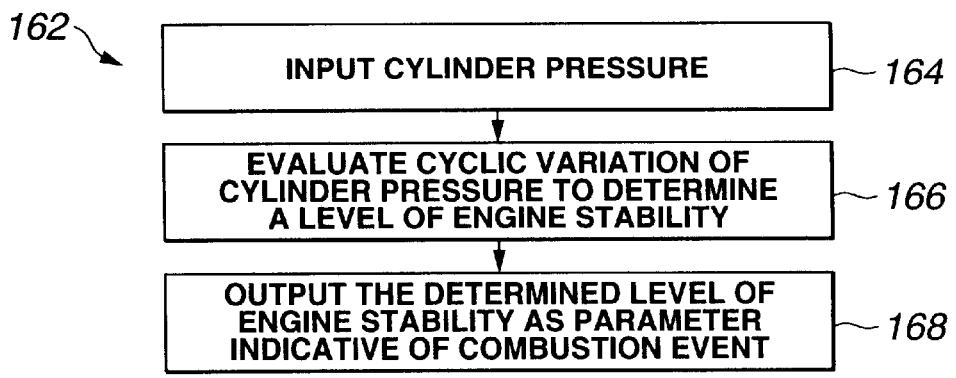
FIGS. 11A and 11B are block diagrams illustrating control logic according to the present invention.
Figure 11B:
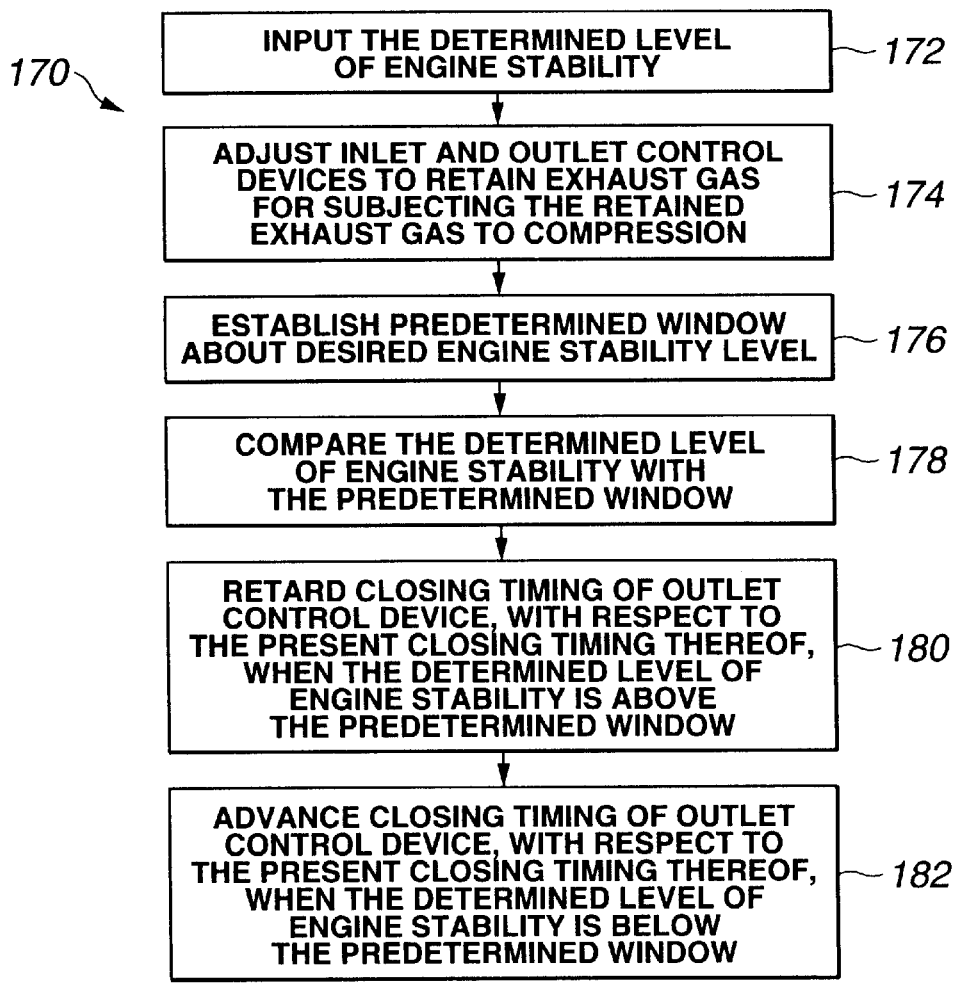

Referring to FIGS. 11A and 11B, an example of control implementation for the diagram of FIG. 7 is shown. As generally indicated at 162 in FIG. 11A, processor 160 inputs cylinder pressure from sensor 42 (block 164). In block 166, cyclic variation or dispersion of cylinder pressure is evaluated to determine a level of engine stability. In block 168, the determined level of engine stability is output as parameter indicative of combustion event.

As generally indicated at 170 in FIG. 11B, engine controller 14 inputs the determined level of engine stability (block 172). In block 174, inlet and outlet control devices are adjusted to retain exhaust gas for subjecting the retained gas to compression. In block 176, a predetermined window about a desired engine stability level is established. In block 178, the determined level of engine stability is compared with the predetermined window. In block 180, closing timing of outlet control device 38 is retarded, with respect to the present closing timing thereof, when the determined level of engine stability is above the predetermined window. In block 182, closing timing of outlet control device 38 is advanced, with respect to the present closing timing thereof, when the determined level of engine stability is below the predetermined window.

Referring to FIG. 12, it may be advantageous to use injection of gasoline fuel during exhaust gas retaining duration. High temperature reactive exhaust gas promote progression of gasoline reform. The progression of gasoline reform includes formation of fuel radicals or aldehyde combined with oxygen. The provision of such reactive elements provides increased ignitability of gasoline fuel at appropriate ignition point around the top dead center position of the subsequent compression stroke. Temperature and pressure environment in cylinder during exhaust gas retaining duration can be controlled by varying the exhaust gas retaining duration.

To provide various durations of exhaust gas retaining phase around TDC position of piston exhaust stroke, closing timing of outlet control device 38 can be varied over various crank positions before the TDC position and opening timing of inlet control device 36 can be varied over crank positions after the TDC position. Of course, there is a limit to advancing closing timing of outlet control device 38 and another limit to retarding opening timing of inlet control device 36 in view of engine performance. Such limits may be defined by hardware or software. The amount of exhaust gas retained increases as closing timing of outlet control device 38 advances, The retained exhaust gas is compressed during the last section of exhaust stroke of piston 18 from the crank position where outlet control device 38. For minimizing energy loss, opening timing of inlet control device 36 is determined such that work done by piston 18 to compress the retained exhaust gas is collected during initial section of induction stroke of piston 18 to a crank position where inlet control device 36 opens.

Assuming now that opening timing of inlet control device 36 is unaltered, if a need arises to advance closing timing of inlet control device 36, engine controller 14 continuously varies the closing timing at a first predetermined rate to increase the exhaust gas retaining duration, If another need arises to retard closing timing of outlet control device 38, controller 14 continuously varies the closing timing at a second predetermined rate to decrease the exhaust gas retaining duration. The second rate is less than the first rate, so that the exhaust gas retaining duration is increased quickly, but it is decreased slowly. This provides an advantageous influence to maintaining engine stability during transient period.

Referring to FIG. 12, as generally indicated at 190, exhaust gas temperature is provided as parameter indicative of combustion event in cylinder 16 (block 192). Inlet and outlet control devices 36 and 38 are adjusted to retain exhaust gas for subjecting the retained exhaust gas to compression (block 194). Fuel injection of gasoline fuel is carried out during exhaust gas retaining duration (block 196). Actual progression of gasoline reform during the exhaust gas retaining duration is estimated based on the parameter (block 198). A predetermined window about a desired progression of gasoline reform is established (block 200). The estimated actual progression of gasoline reform is compared with the predetermined window (block 202). At least closing timing of outlet control device 38 is varied, with respect to the present closing timing thereof, when the estimated actual progression falls outside of the predetermined window (block 204).

Figure 13:
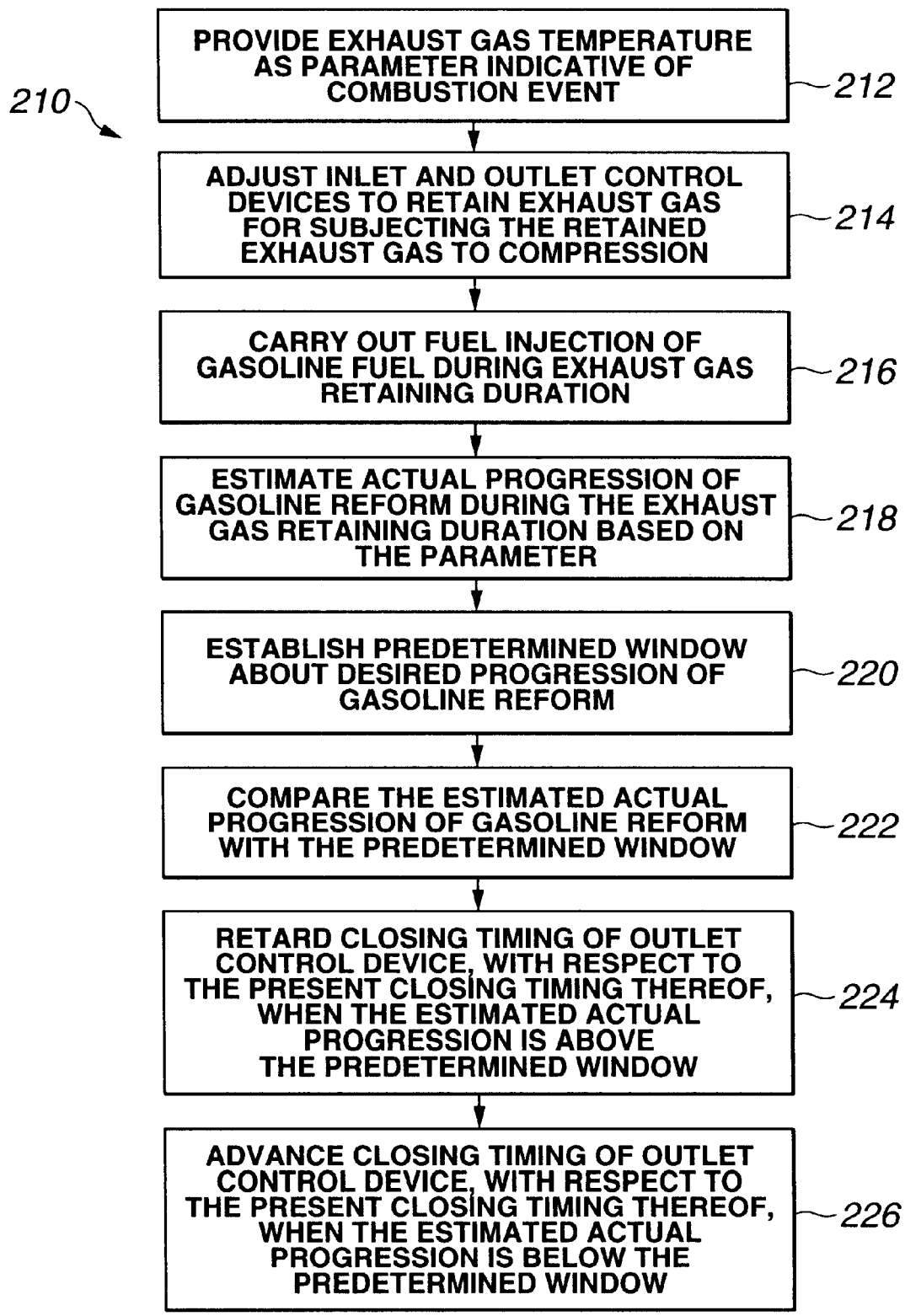
FIG. 13 is a block diagram illustrating control logic according to the present invention.

With reference to FIG. 13, in a preferred control implementation of the present invention, as generally designated at 210, exhaust gas temperature is provided as parameter indicative of combustion event in cylinder 16 (block 212). Inlet and outlet control devices 36 and 38 are adjusted to retain exhaust gas for subjecting the retained exhaust gas to compression (block 214). Fuel injection of gasoline fuel is carried out during exhaust gas retaining duration (block 216). Actual progression of gasoline reform during the exhaust gas retaining duration is estimated based on the parameter (block 218). A predetermined window about a desired progression of gasoline reform is established (block 220). The estimated actual progression of gasoline reform is compared with the predetermined window (block 222). Closing timing of outlet control device 38 is retarded, with respect to the present closing timing thereof, when the estimated actual progression is above the predetermined window (block 224). Closing timing of outlet control device 38 is advanced, with respect to the present closing timing thereof, when the estimated actual progression is below the predetermined window (block 226).

Figure 14:
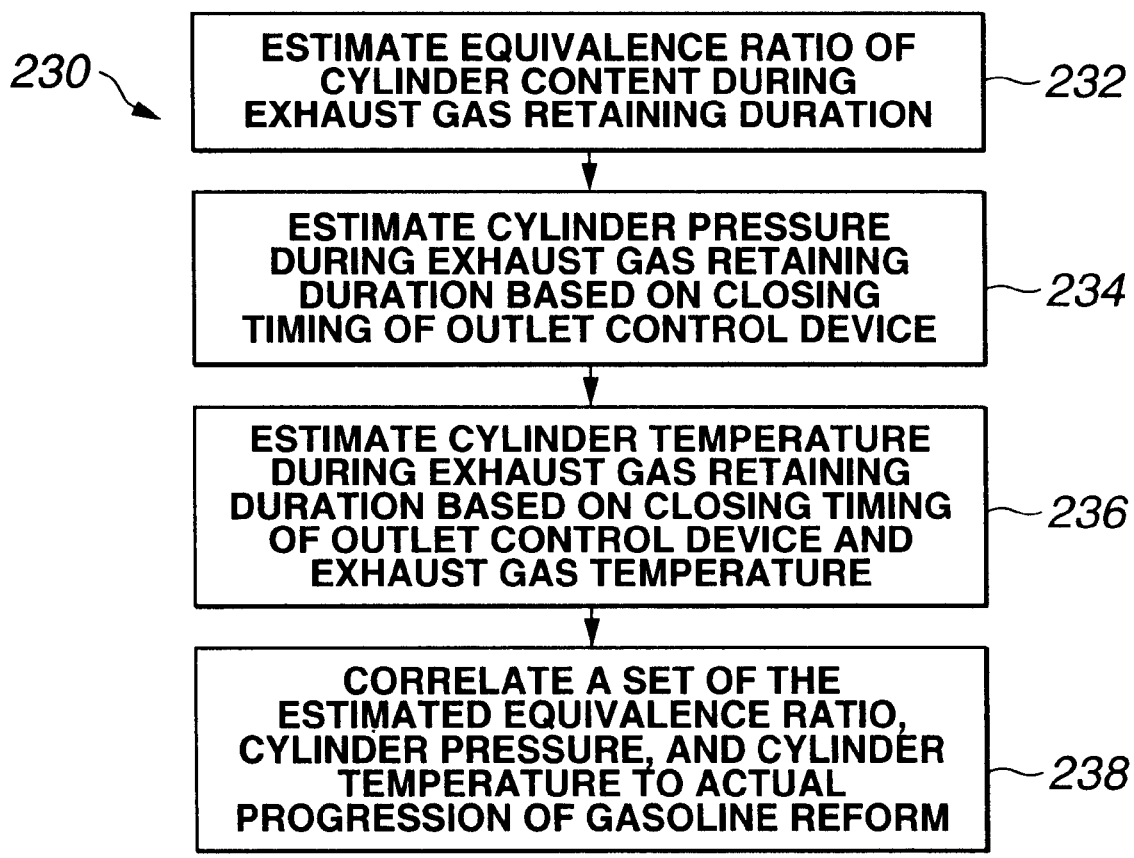
FIG. 14 is a block diagram illustrating a portion of the control logic shown in FIGS. 12 or 13.

Referring to FIG. 14, an example of control implementation to estimate actual progression of gasoline reform is shown. As generally indicated at 230, equivalence ratio of cylinder content during exhaust gas retaining duration is estimated (block 232). Cylinder pressure during exhaust gas retaining duration is estimated based on closing timing of outlet control device 38 (block 234). Cylinder temperature during exhaust gas retaining duration is estimated based on closing timing of outlet control device and exhaust gas temperature (block 236). A set of the estimated equivalence ratio, cylinder pressure, and cylinder temperature is correlated to actual progression of gasoline reform (block 238).

Figure 15:
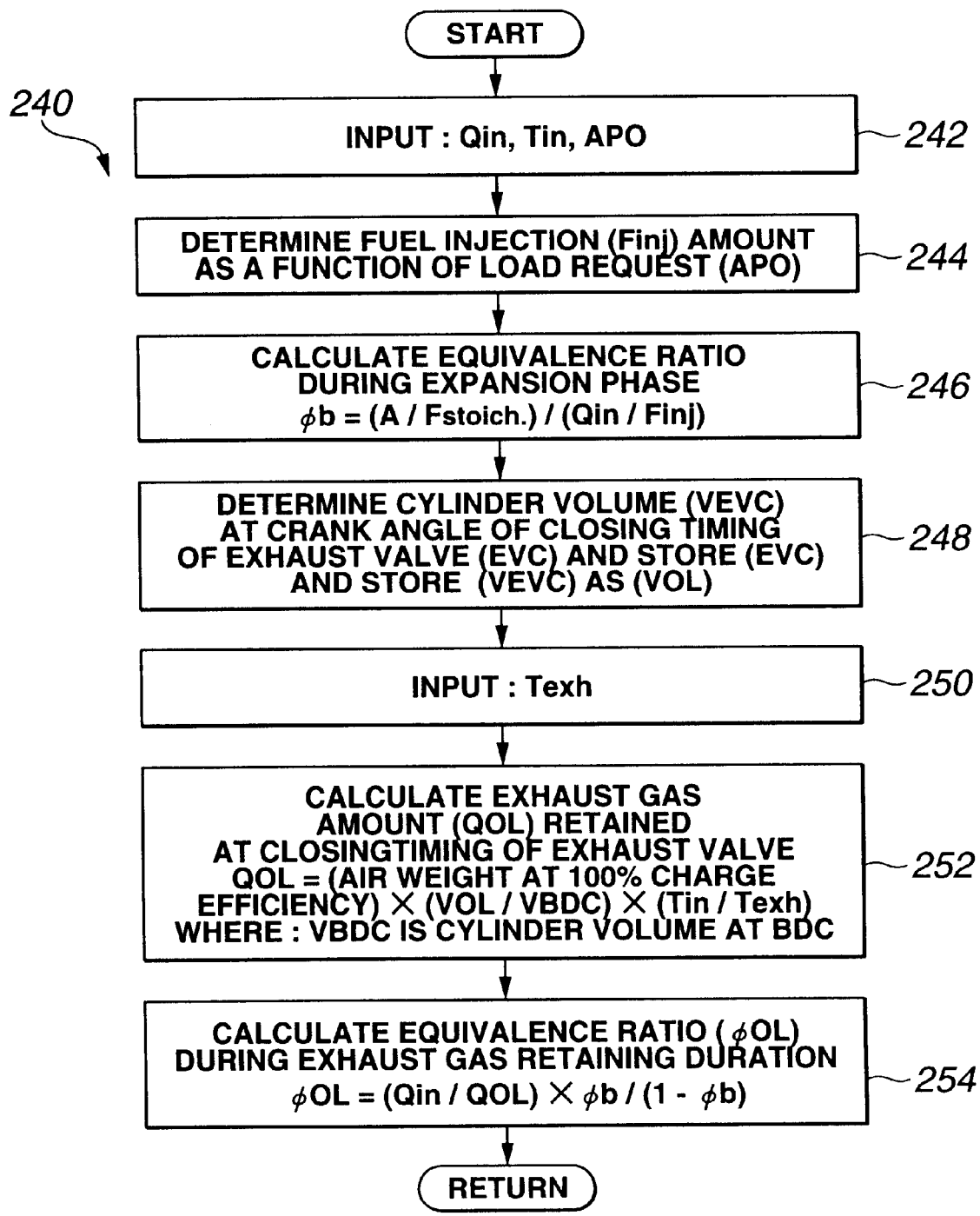
FIG. 15 is a flowchart illustrating a portion of the control logic shown in FIG. 14.

An example of how a controller would implement block 232 of FIG. 14 can be understood with reference to FIG. 15. The flowchart of FIG. 15 illustrates a control routine, as generally indicated at 240, of a preferred implementation of the present invention. In block 242, controller 14 inputs intake air amount Qin, intake air temperature Tin, and accelerator opening degree APO. In block 244, fuel injection amount Finj is determined as a function of load request as represented by accelerator opening degree APO. In block 246, equivalence ratio Φb during piston expansion phase is calculated. Equivalence ratio Φb can be expressed as:

$$\Phi b = (A/F_{stoich.})/(Qin/Finj) \tag{1}$$

where: $A/F_{stoich.}$ represents the theoretical equivalence ratio.

In block 248, cylinder volume VEVC at crank angle position of closing timing (EVC) of outlet control device (exhaust valve) is determined as a function of crank angle of closing timing. The result VEVC is stored as volume for containing gas VOL. In block 250, controller 14 inputs exhaust gas temperature Texh. In block 252, exhaust gas amount QOL retained at closing timing of outlet control device (exhaust valve) is calculated. The retained exhaust gas amount QOL can be expressed as:

$$QOL = (\text{Air weight at 100\% charge efficiency}) \times (VOL/VBDC) \times (Tin/Texh) \quad (2)$$

where VBDC represents cylinder volume at piston botomm dead center (BDC).

In block 254, equivalence ratio $\Phi OL$ during exhaust gas retaining duration is calculated. The equivalence ratio $\Phi OL$ can be expressed as:

$$\Phi OL = (Qin/QOL) \times \Phi b/(1-\Phi b) \quad (3),$$

Figure 16:
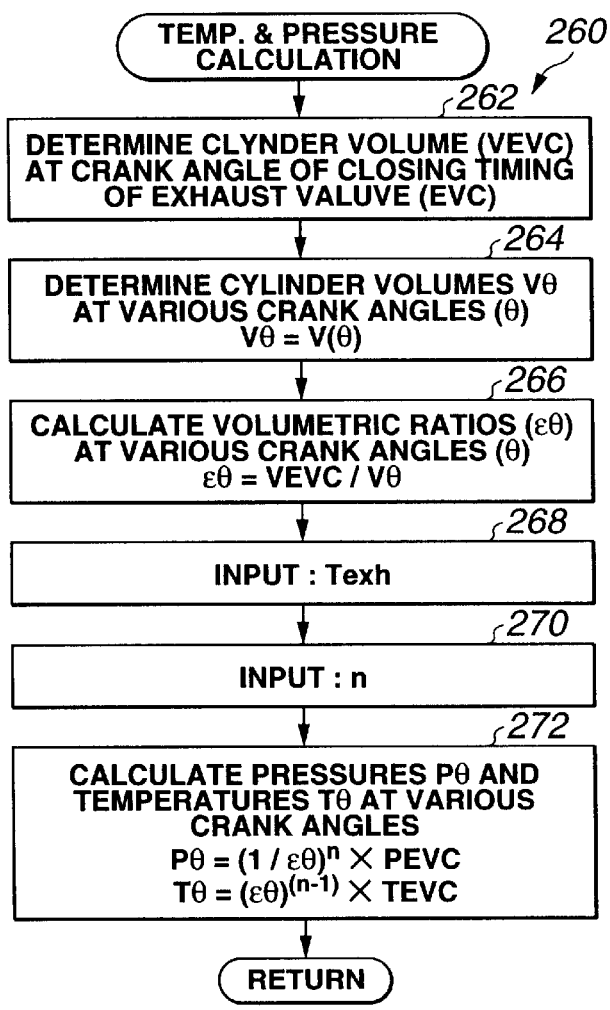
FIG. 16 is a flowchart illustrating a portion of the control logic shown in FIG. 14.

An example of how a controller would implement blocks 234 and 236 of FIG. 14 can be understood with reference to FIG. 16. The flowchart of FIG. 16 illustrates a control routine, as generally indicated at 260, of a preferred implementation of the present invention. Control routine 260 calculates cylinder temperature $T\theta$ and pressure Pe during exhaust gas retaining duration based on the assumption that progression of compression and expansion of exhaust gas follows polytropic process. In block 262, cylinder volume VEVC at crank angle of closing timing (EVC) of outlet control device (exhaust valve) is determined. In block 264, cylinder volumes $V\theta$ at various crank angles ($\theta$) are determined. $V\theta$ is determined as a function of crank angle $\theta$, i.e., $V\theta = V(\theta)$. In block 266, volumetric ratios $\epsilon\theta$ at various crank angles after closing timing of outlet control device (exhaust valve) are calculated. Volumetric ratio $\epsilon\theta$ can be expressed as:

$$\epsilon\theta = VEVC/V\theta \quad (4).$$

In block 268, controller 14 inputs exhaust gas temperature Texh. In block 270, controller 14 sets a polytropic index n as around 1.3. In block 272, cylinder pressures $P\theta$ and cylinder temperatures $T\theta$ at various crank angles during exhaust gas retaining duration are calculated. Cylinder pressure $P\theta$ and $T\theta$ can be expressed as:

$$P\theta = (1/\epsilon\theta)^n \times PEVC \quad (5),$$

$$T\theta = (\epsilon\theta)^{(n-1)} \times TEVC \quad (6),$$

where: PEVC represents cylinder pressure at closing timing of outlet control device (exhaust valve) and can be approximated by atmospheric pressure, TEVC represents cylinder temperature at closing timing of outlet control device (exhaust valve) and can be approximated by exhaust gas temperature Texh.

Figure 17:
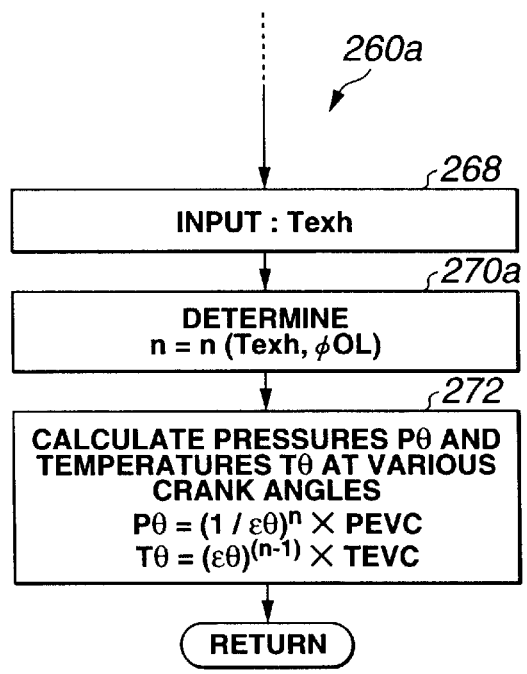
FIG. 17 is a fragmentary flowchart illustrating a modification of the flowchart of FIG. 16.
Figure 18:
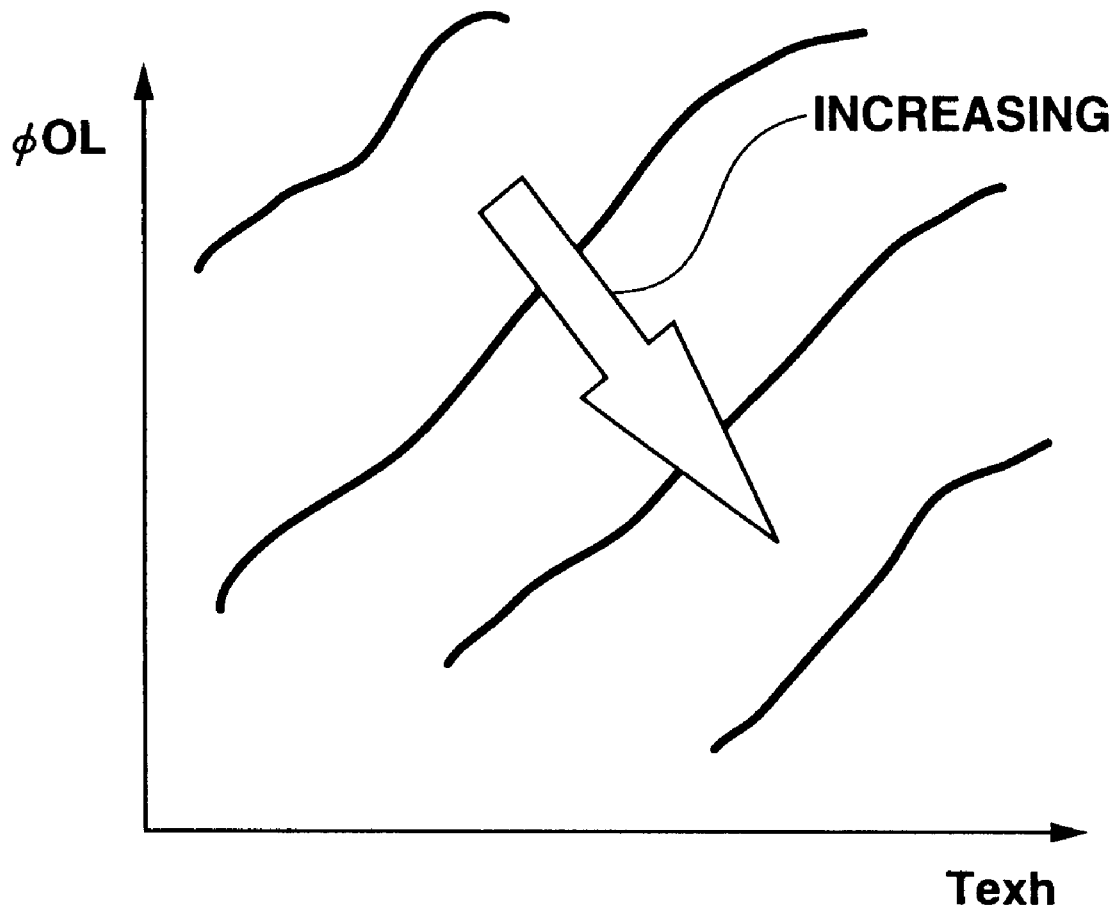
FIG. 18 is a graphical representation of a map used in the flowchart of FIG. 17.

If more accuracy is requested, the polytroic index n may be determined by referring to a map as illustrated in FIG. 18 against Texh and $\Phi OL$ (block 270a of control routine as generally indicated at 260a in FIG. 17).

Referring to FIG. 17, control routine 260a is substantially the same as control routine 260 of FIG. 16 except the use of block 270a instead of block 270.

Figure 19:
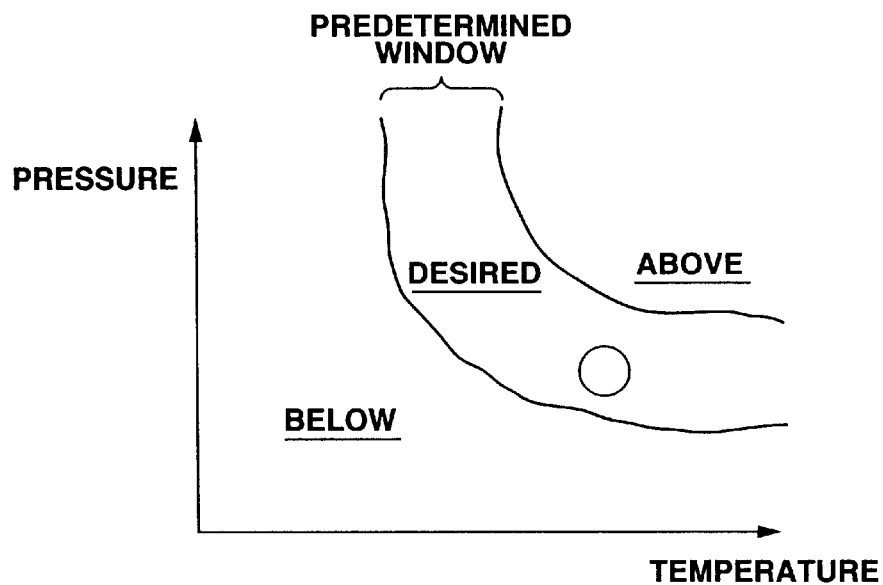
FIG. 19 is a graphical representation of a map that may be used in the control logic shown in FIG. 14.

With reference FIG. 19, it is explained as to an example of how a control would correlate a set of equivalence ratio $\Phi OL$, cylinder pressure $P\theta$ around TDC of piston exhaust stroke, and cylinder temperature $T\theta$ around TDC of piston exhaust stroke to actual progression of gasoline reform and determine whether or not the same falls in a predetermined window. Maps correlating a set of these parameters are determined using engine models or engine test data. At a given equivalence ratio $\epsilon$, a particular one of the maps as illustrated in FIG. 19 is referred to by $T\theta$ and $P\theta$. In FIG. 19, the horizontal axis represents $T\theta$, and the vertical axis represents $P\theta$. Two curves represent lower and upper limits of a predetermined window. A small circle represents a condition in cylinder during exhaust gas retaining duration. If the small circle falls in the predetermined window, controller 14 determines that the present closing timing of outlet control device (exhaust valve) is appropriate. If the small circle is above the upper limit of the predetermined window, controller 14 determines that the present closing timing of outlet control device (exhaust valve) needs to be retarded. If the small circle is below the lower limit of the predetermined window, controller 14 determines that the present closing timing of outlet control device (exhaust valve) needs to be advanced.

Figure 20:
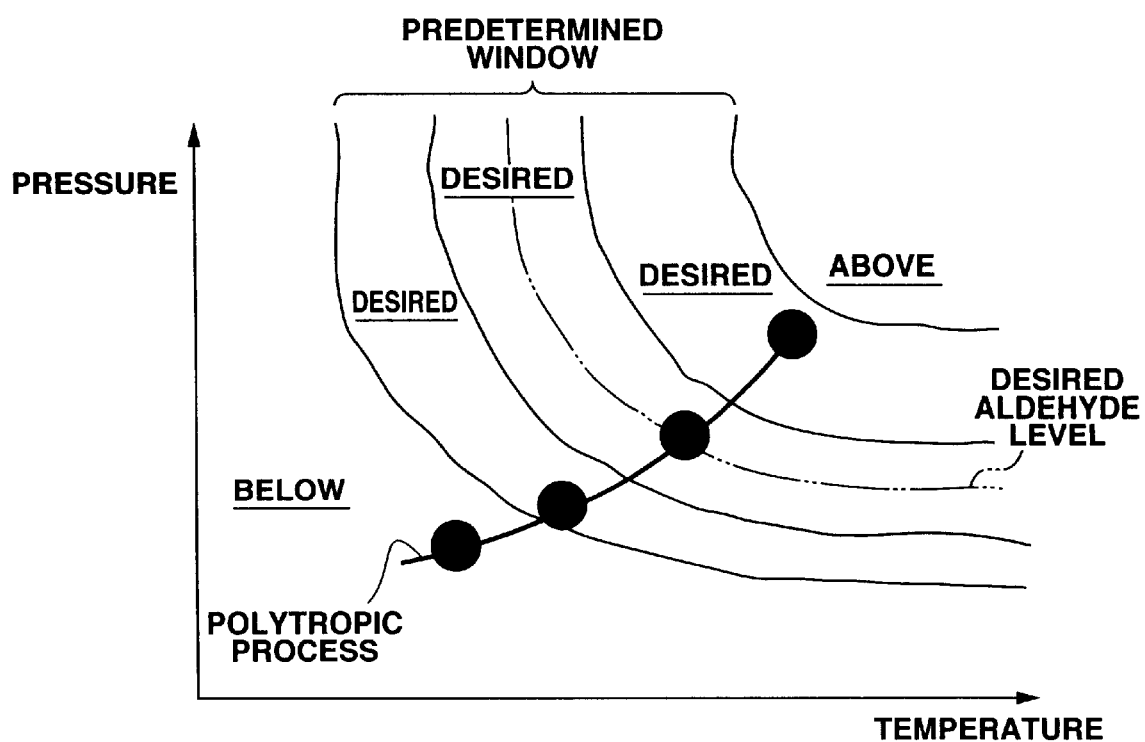
FIG. 20 is a graphical representation of a map illustrating a predetermined window around a desired aldehyde level in amount
Figure 21:
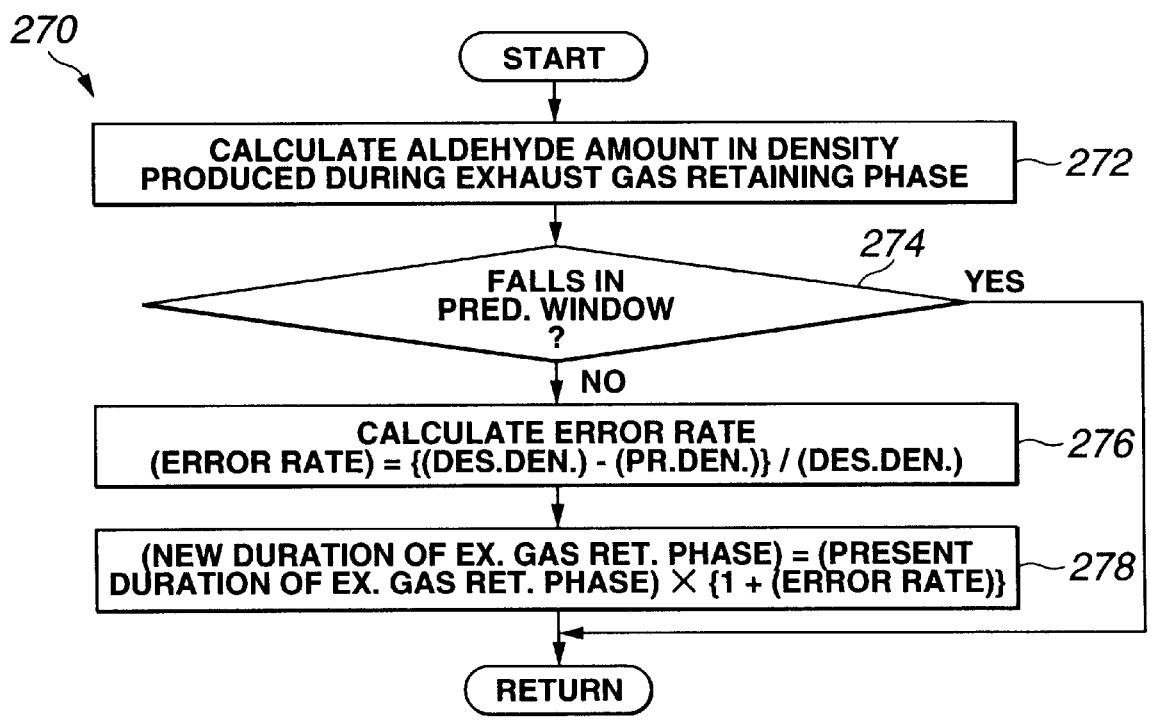
FIG. 21 is a flowchart illustrating control logic according to the present invention.

With reference to FIGS. 20 and 21, in a preferred control implementation of the present invention, amount of aldehyde is determined using a set of equivalence ratio $\Phi b$, cylinder temperatures $P\theta$, and cylinder temperatures $T\theta$. Amount of aldehyde may be determined by using map or maps, which have been prepared by chemical reaction simulation program. FIG. 20 illustrates one example of such map for an equivalence ratio during exhaust gas retaining duration. Controller 14 stores such maps and selects one particular map using the equivalence ratio $\Phi b$. The selected map is retrieved using $P\theta$ and $T\theta$ over various crank angles during exhaust gas retaining duration to provide amounts of aldehyde at the various crank angles. Controller 14 calculates the integration or sum of such amounts of aldehyde to give total amount of aldehyde to be produced during exhaust gas retaining duration.

Referring to FIG. 21, the flowchart illustrates a control routine as generally indicated at 270 according to preferred implementation of the present invention. In block 272, total amount of aldehyde (in density) produced during exhaust gas is calculated as mentioned above. In interrogation block 274, it is determined whether or not the total amount of aldehyde falls in a predetermined window (see FIG. 20). If this is the case, control 270 is terminated. If this is not the case, control goes to blocks 276 and 278. In block 276, error rate is calculated. The error rate can be expressed as:

$$(\text{Error rate}) = (\text{Desired density}) - (\text{Present density})/(\text{Desired density}) \quad (7).$$

In block 278, new duration of exhaust gas retaining phase is determined in terms of closing timing of outlet control device (exhaust valve). The new duration can be expressed as:

$$(\text{New exhaust gas retaining duration}) = (\text{Present exhaust gas retaining duration}) \times \{1 + (\text{Error rate})\} \quad (8).$$

By controlling closing timing of outlet control device (exhaust valve) using the equation (8), very fine and quick adjustment of exhaust gas retaining duration can be carried out against varying operating conditions.

While the present invention has been particularly described, in conjunction with preferred implementations and embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications No. 2000-095500, filed Mar. 30, 2000, the disclosure of each of which is hereby incorporated by reference in its entirety.

What is claimed is:

1. An auto-ignition type internal combustion engine, comprising:
    at least one cylinder;
    an inlet control device for controlling flow into the cylinder;
    an outlet control device for controlling flow from the cylinder;
    a fuel injection device for supplying gasoline fuel into the cylinder;
    a generator for providing a parameter indicative of combustion event within the cylinder; and
    an engine controller for adjusting the inlet and outlet control devices to retain exhaust gas for subjecting the retained exhaust gas to compression and varying at least closing timing of the outlet control device based on the parameter to vary an amount of the exhaust gas to be retained.

2. The auto-ignition type internal combustion engine as claimed in claim 1,
    wherein the engine controller has a computer readable storage medium having stored therein data representing instructions for the engine controller to:
    determine engine stability based on the parameter;
    compare the determined engine stability with a predetermined window about a desired engine stability level; and
    vary closing timing of the outlet control device, with respect to the present closing timing thereof, when the determined engine stability falls outside of the predetermined window.

3. The auto-ignition type internal combustion engine as claimed in claim 2,
    wherein the instructions for the engine controller to vary closing timing of the outlet control device include:
    retarding closing timing of the outlet control device, with respect to the present closing timing thereof, when the determined engine stability is above the predetermined window; and
    advancing closing timing of the outlet control device, with respect to the present closing timing thereof, when the determined engine stability is below the predetermined window.

4. The auto-ignition type internal combustion engine as claimed in claim 2, wherein the fuel injection device includes a fuel injector directly communicating with the cylinder for spraying gasoline fuel into the cylinder during an exhaust gas retaining duration when the retained exhaust gas undergoes compression.

5. The auto-ignition type internal combustion engine as claimed in claim 1, wherein the parameter is indicative of exhaust gas temperature of exhaust gas from the cylinder.

6. The auto-ignition type internal combustion engine as claimed in claim 5,
    wherein the fuel injection device includes a fuel injector directly communicating with the cylinder for spraying gasoline fuel into the cylinder during an exhaust gas retaining duration when the retained exhaust gas undergoes compression; and
    wherein the engine controller has a computer readable storage medium having stored therein data representing instructions for the engine controller to:
    estimate actual progression of gasoline reform during the exhaust gas retaining duration based on the parameter;
    compare the estimated actual progression with a predetermined window about a desired progression level; and
    vary closing timing of the outlet control device, with respect to the present closing timing thereof, when the estimated actual progression falls outside of the predetermined window.

7. The auto-ignition type internal combustion engine as claimed in claim 6,
    wherein the instructions for the engine controller to estimate the actual progression of gasoline reform include:
    estimating an equivalence ratio of cylinder content within the cylinder during the exhaust gas retaining duration;
    estimating cylinder pressure within the cylinder during the exhaust gas retaining duration based on the closing timing of the outlet control device;
    estimating cylinder temperature within the cylinder during the exhaust gas retaining duration based on the closing timing of the outlet control device and the parameter; and
    correlating a set of the equivalence ratio and the cylinder pressure and the cylinder temperature to the actual progression of gasoline reform.

8. The auto-ignition type internal combustion engine as claimed in claim 7,
    wherein the sub-instructions for estimating the equivalence ratio of cylinder content within the cylinder during the exhaust gas retaining duration include:
    determining intake air amount of intake air to the cylinder;
    determining intake air temperature of the intake air;
    determining fuel injection amount of gasoline fuel to be supplied to the cylinder by the fuel injector;
    correlating a set of the intake air amount, the intake air temperature, and the fuel injection amount to the equivalence ratio of cylinder content within the cylinder during the exhaust gas retaining duration.

9. The auto-ignition type internal combustion engine as claimed in claim 6,
    wherein the instructions for the engine controller to vary closing timing of the outlet control device include:
    retarding closing timing of the outlet control device, with respect to the present closing timing thereof, when the estimated actual progression is above the predetermined window; and
    advancing closing timing of the outlet control device, with respect to the present closing timing thereof, when the estimated actual progression is below the predetermined window.

10. The auto-ignition type internal combustion engine as claimed in claim 6, wherein the actual progression of gasoline reform is amount of aldehyde produced during the exhaust gas retaining duration.

11. The auto-ignition type internal combustion engine as claimed in claim 5,
    wherein the fuel injection device includes a fuel injector directly communicating with the cylinder for spraying fuel into the cylinder during an exhaust gas retaining duration when the retained gas undergoes compression; and
    wherein the engine controller has a computer readable storage medium having stored therein data representing instructions for the engine controller to:
    estimate an equivalence ratio of cylinder content within the cylinder during the exhaust gas retaining duration;

estimate cylinder pressure within the cylinder around a top dead center (TDC) position during the exhaust gas retaining duration based on the closing timing of the outlet control device;

estimate cylinder temperature within the cylinder around the TDC position during the exhaust gas retaining duration based on the closing timing of the outlet control device and the parameter;

determine whether the present closing timing of the outlet control device needs to be retarded or advanced from a set of the equivalence ratio, the cylinder pressure, and the cylinder temperature;

retard closing timing of the outlet control device, with respect to the present closing timing thereof, in response to determination that the present closing timing of the outlet control device needs to be delayed; and advance closing timing of the outlet control device, with respect to the present closing timing thereof, in response to determination that the present closing timing of the outlet control device needs to be advanced.

12. The auto-ignition type internal combustion engine as claimed in claim 1, wherein the engine controller varies closing timing of the outlet control device at a faster rate in a timing advancing direction than in a timing retarding direction.

13. The auto-ignition type internal combustion engine as claimed in claim 1, wherein the generator includes a cylinder pressure sensor that detects cylinder pressure within the cylinder.

14. The auto-ignition type internal combustion engine as claimed in claim 1, wherein the generator includes a cylinder pressure sensor that detects cylinder pressure within the cylinder, and a processor that evaluates cyclic variation of cylinder pressure to determine a level of engine stability and outputs the determined level of engine stability as the parameter.

15. The auto-ignition type internal combustion engine as claimed in claim 14,
wherein the engine controller has a computer readable storage medium having stored therein data representing instructions for the engine controller to:
input the determined level of engine stability;
establish a predetermined window about a desired engine stability level;
compare the determined level of engine stability with the predetermined window;
retard closing timing of the outlet control device, with respect to the present closing timing thereof, when the determined level of engine stability is above the predetermined window; and
advance closing timing of the outlet control device, with respect to the present closing timing thereof, when the determined level of engine stability is below the predetermined window.

16. An auto-ignition type internal combustion engine, comprising:
at least one cylinder;
an inlet control device for controlling flow into the cylinder;
an outlet control device for controlling flow from the cylinder;
a fuel injection device for supplying gasoline fuel into the cylinder; and
an engine controller for adjusting the inlet and outlet control devices to retain exhaust gas for subjecting the retained exhaust gas to compression during an exhaust gas retaining duration;

the engine controller having a computer readable storage medium having stored therein data representing instructions for the engine controller to:
estimate cylinder temperature within the cylinder around end of the compression during the exhaust gas retaining duration;
determine whether present closing timing of the outlet control device needs to be delayed or needs to be advanced based on the estimated cylinder temperature;
delay closing timing of the outlet control device in response to determination that the present closing timing needs to be delayed; and
advance closing timing the outlet control device in response to determination that the present closing timing needs to be advanced.

17. A system for controlling auto-ignition of a four-stroke gasoline internal combustion engine, the engine having at least one cylinder, the system comprising:
inlet control means for controlling flow into the cylinder;
outlet control means for controlling flow from the cylinder;
means for providing a parameter indicative of combustion event within the cylinder; and
means for adjusting the inlet and outlet control means to retain exhaust gas for subjecting the retained exhaust gas to compression and varying at least closing timing of the outlet control device based on the parameter to vary an amount of the exhaust gas to be retained.

18. A system for controlling auto-ignition of a four-stroke gasoline internal combustion engine, the engine having at least one cylinder with a piston, the system comprising:
an inlet control device for controlling flow into the cylinder;
an outlet control device for controlling flow from the cylinder; and
an engine controller for adjusting the inlet and outlet control devices to retain exhaust gas for subjecting the retained exhaust gas to compression by movement of the piston toward a top dead center (TDC) position, determining engine stability, establishing a predetermined window about a desired engine stability level, comparing the determined engine stability with the predetermined window, determining whether present closing timing of the outlet control device needs to be delayed or advanced based on the comparing result, delaying closing timing of the outlet control device in response to determination that the present closing timing needs to be delayed, and advancing closing timing of the outlet control device in response to determination that the present closing timing needs to be advanced.

19. A method for controlling auto-ignition of a four-stroke gasoline internal combustion engine, the engine having at least one cylinder with a piston, an inlet control device for controlling flow into the cylinder, and an outlet control device for controlling flow from the cylinder, the method comprising:
adjusting the inlet and outlet control devices to retain exhaust gas for subjecting the retained exhaust gas to compression;
determining engine stability;

establishing a predetermined window about a desired engine stability level;

comparing the determined engine stability with the predetermined window;

determining whether present closing timing of the outlet control device needs to be delayed or advanced based on the comparing result;

delaying closing timing of the outlet control device in response to determination that the present closing timing of the outlet control device needs to be delayed; and advancing closing timing of the outlet control device in response to determination that the present closing timing of the outlet control device needs to be advanced.

20. A computer readable storage medium having stored therein data representing instructions executable by an engine controller to control auto-ignition of an internal combustion engine, the engine having at least one cylinder, an inlet control device for controlling flow into the cylinder, and an outlet control device for controlling flow from the cylinder, the computer readable storage medium comprising:

instructions for adjusting the inlet and outlet control devices to retain exhaust gas for subjecting the retained exhaust gas to compression;

instructions for determining engine stability;

instructions for establishing a predetermined window about a desired engine stability level;

instructions for comparing the determined engine stability with the predetermined window;

instructions for determining whether present closing timing of the outlet control device needs to be delayed or delayed or advanced based on the comparing result;

instructions for delaying closing timing of the outlet control device in response to determination that the present closing timing of the outlet control device needs to be delayed; and instructions for advancing closing timing of the outlet control device in response to determination that the present closing timing of the outlet control device needs to be advanced.

* * * * *